United States Patent [19]

Spinhirne

[11] Patent Number: 5,204,784
[45] Date of Patent: Apr. 20, 1993

[54] DEFORMABLE MIRROR WITH PNEUMATIC ACTUATOR PRE-LOAD

[75] Inventor: James M. Spinhirne, Albuquerque, N. Mex.

[73] Assignee: The United States of America as represented by the Secretary of the Air Force, Washington, D.C.

[21] Appl. No.: 622,911

[22] Filed: Dec. 6, 1990

[51] Int. Cl.⁵ .......................................... G02B 7/185
[52] U.S. Cl. .................... 359/849; 359/846
[58] Field of Search ................ 350/607, 609, 610, 611

[56] References Cited

U.S. PATENT DOCUMENTS

| | | |
|---|---|---|
| 3,904,274 | 9/1975 | Feinleib et al. . |
| 4,175,835 | 11/1979 | Kuhn, Jr. . |
| 4,492,431 | 1/1985 | Eitel et al. ............................ 350/611 |
| 4,655,560 | 4/1987 | Glomb, Jr. . |
| 4,679,915 | 7/1987 | Kritz et al. . |
| 4,844,603 | 7/1989 | Eitel et al. ............................ 350/611 |
| 4,934,803 | 6/1990 | Ealey ..................... 350/609 |
| 5,016,998 | 5/1991 | Butler et al. ........................ 350/607 |

FOREIGN PATENT DOCUMENTS

3502024A1 7/1986 Fed. Rep. of Germany .

*Primary Examiner*—Bruce Y. Arnold
*Assistant Examiner*—J. P. Ryan
*Attorney, Agent, or Firm*—Thomas C. Stover; Donald J. Singer

[57] ABSTRACT

In a deformable mirror having a mirror face plate and a plurality of axially movable piezoelectric actuators for controlling the contour thereof, an improvement is provided by which a pneumatic pre-load assembly is inserted between the face plate and the actuators. The assembly includes a core, having apertures therethrough, with a plurality of mirror surface contour posts passing separately through said apertures and a diaphragm plate which is mounted between the face plate and the core and spaced from such face plate but in contact with such core and one end of the posts. A rear plate is mounted to the other end of such posts and in spaced proximity with the core, which core, together with the diaphragm plate and the rear plate, define a cavity therebetween. The posts are aligned with actuators on the other side of the rear plate. Gas is applied to such cavity to bring the posts and the rear plate into contact with their associated actuators so as to pre-load them. A voltage is then applied to the piezoelectric actuators to increase their length against the pre-loaded rear plate and the posts to change the contour of the mirror face plate. Such pre-loaded rear plate tends to compress the actuators when the voltage is shut off so that by controlling the voltage, one can move the mirror surface contour back and forth as desired.

9 Claims, 3 Drawing Sheets

DEFORMABLE MIRROR WITH PNEUMATIC ACTUATOR PRE-LOAD

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to the deformable mirrors which upon replacement of a component, can repeat the pre-replacement mirror surface contour thereof.

2. The Prior Art

Deformable mirrors are employed to correct distorted beams of various kinds, e.g., of white light, UV light, or laser beams. A problem has been that once the desired mirror contour is found and an actuator of a prior art deformable mirror, such as shown in FIG. 1, must be replaced, the compression spring can inflict permanent deformation on the face plate and mirror surface thereof to the detriment of the reflected beam and require a repair measure such as re-polishing of the mirror surface, as more fully discussed below.

The prior art does not appear to suggest a solution to this problem. For example, U.S. Pat. No. 3,904,274 to Feinleib (1975) discloses a mirror with piezoelectric actuators therein which are not replaceable. U.S. Pat. No. 4,679,915 to Kriz et al. (1987), teaches a deformable mirror having columns of electrical actuators which are pre-stressed by a threaded bolt 39 (FIG. 1), rather than being pre-stressed by a spring, e.g., spring 28 of FIG. 2 herein, so that mirror deformation caused by spring unloading does not arise.

There is also a German Patent DE 3502024 A1 to Herrmann (1986) which discloses manual, pneumatic, axial adjustment of the pressure on piezoelectric actuators and release thereof. However, such application and release of pneumatic pressure is done individually and can result in mirror distortion by pressure differential between the respective actuators.

It appears that the closest prior art is illustrated in FIG. 2 herein, wherein replacement of an actuator will result in compression spring expansion and distortion forces applied to the face plate and mirror surface that can be permanent, as more fully discussed below.

The reason that a compression preload on the actuator is needed in the first place, is as follows. An actuator such as a piezoelectric stack, can, by application of a voltage to the wafers in the stack, cause such wafers to thicken and extend the length of the stack and thus the length of the actuator so as to push on a contour post and deform the mirror surface outwardly. However, upon discontinuance of such voltage there-across, such stack contracts and a countering, compressive force or preload, on such contour post, is needed to enable such post to maintain contact with such stack and follow it as it recedes so as to deform (or contour) the mirror surface inwardly when desired. Accordingly such actuator is resiliently preloaded, e.g., per the spring of FIG. 2, to enable the mirror surface (and contour post) to move axially back and forth with the actuator. However, in the prior art, when an attempt is made to remove an actuator for replacement purposes, the preload spring expands, causing deformation to the mirror surface as discussed above. Another problem is that the replacement actuator may be of greater or lesser length than the previous one and upon installation, causes further distortion to the face plate and mirror surface.

Accordingly, there is a need and market for compression release and decoupling of mirror components such as an actuator that avoids permanent deformation to the mirror surface and overcomes the above prior art shortcomings.

There has now been discovered a preloaded deformable mirror wherein components, such as actuators, can be removed and returned or replaced with another actuator, without permanent damage to the mirror surface and in a manner so as to repeat the pre-substitution mirror surface deformation or contour. That is, mirror polishing or other repair procedures are avoided or made unnecessary, by the pre-loaded deformable mirror of the present invention.

SUMMARY OF THE INVENTION

Broadly the present invention provides a deformable mirror having a face plate and a plurality of axially movable actuators for controlling the surface contour of such mirror, the improvement comprising, inserting a pneumatic, pre-load assembly between such actuators and the face plate, which assembly includes:

a) diaphragm plate mounted behind and proximate the face plate, b) a rear plate, spaced from and behind the diaphragm plate, c) an apertured core mounted between the diaphragm and rear plates, which core is attached to the diaphragm plate and spaced from the rear plate to define a cavity therewith and therein, d) a plurality of contour posts, each mounted in and through an aperture in the core, each post contacting the diaphragm plate and then the face plate at one end and contacting the rear plate at the other end of such post so as to substantially align with an actuator, e) means to apply gas pressure between the diaphragm and rear plates and in the cavity not occupied by said core to move the posts into contact with the actuators to pneumatically pre-load same, so that the face plate and mirror contour surface are adjustable by axial adjustment of the posts due to changes in the length of the actuators and f) means to release the applied gas from the cavity and reduce the actuator pre-load for removal or replacement of the actuator or other component of the assembly.

As indicated above the pre-loaded deformable mirror of the present invention provides for removal of actuators without permanent deformation to the mirror surface and upon installation of the replacement actuator, one can reproduce or nearly so, the pre-replacement mirror surface contour.

Further the pre-loaded deformable mirror of the invention, includes a rear plate interposed between contour post and actuator, which prevents buckling or side-forces therebetween, even when these two elements are out of axial alignment and thus avoids the face plate and mirror warping that can occur in prior art deformable mirrors.

BRIEF DESCRIPTION OF THE DRAWINGS

The invention will become more apparent from the following detailed specification and drawings in which.

DESCRIPTION OF THE PREFERRED EMBODIMENT

Figure 1:
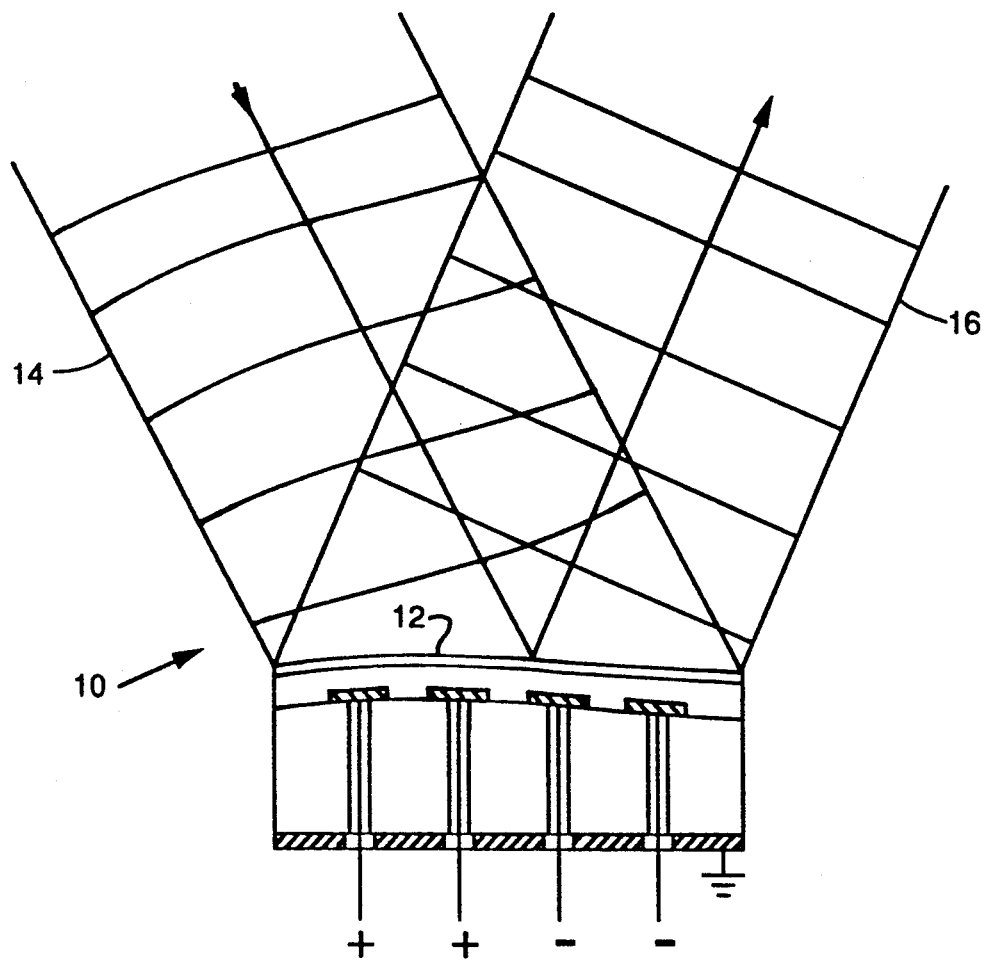
FIG. 1 is a schematic elevation view partly in section, of a deformable mirror of the prior art, in operation.

Referring in more detail to the drawings, deformable mirror 10, having a deformed mirror surface 12, receives a distorted light wave 14 and reflects it upwardly as corrected light wave 16, as shown in FIG. 1.

Figure 2:
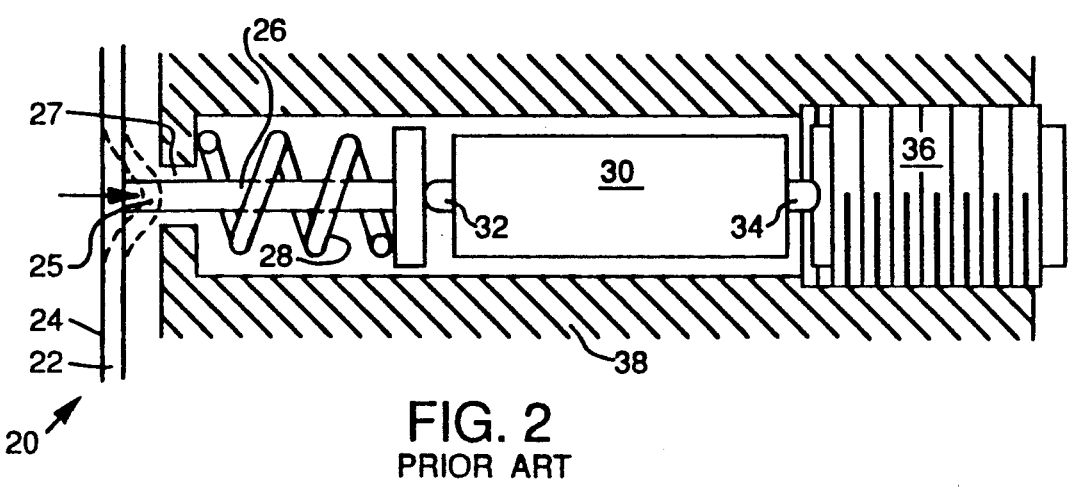
FIG. 2 is an elevation view partly in section, of a pre-loaded deformable mirror of the prior art.

Pre-loaded deformable mirror 20, of the prior art, has a face plate 22, with a mirror surface 24, as shown in FIG. 2. The face plate 22 is backed by a contour post 26, which is pre-loaded by spring 28 against actuator 30, having nub 32 in contact with the contour post 26 at one end and having nib 34 in contact with adjustment screw 36, threadably mounted in substrate 38, as shown in FIG. 2.

In operation, turning of the adjustment screw 36 initially brings the actuator nub 32 into contact with the contour post 26, as indicated in FIG. 2. Application of voltage to the actuator 30 (by means not shown) causes such actuator to expand longitudinal and push the post 26 against the compression spring 28 and deform the face plate 22 outwardly, as indicated in FIG. 2. Shutting off the voltage through the actuator 30, causes such actuator 30 to contract in length, under the pressure of compression spring 28 and thus deform the base plate 22 inwardly, as indicated in FIG. 2.

However, when the actuator 30 is in need of replacement or repair, one rotates the adjustment screw 36 rearwardly to retract such actuator 30 from the contour post 26, which post however advances due to expansion of the compression spring 28, until it deforms the face plate 22 into the permanent kink 25 in the substrate opening 27, as shown in FIG. 2. When the actuator 30 is replaced and advanced by the adjustment screw 36, against the spring-loaded contour post 26, to push the face plate 22 back outwardly of the substrate 38, the kink or other distortion remains and mirror polishing or other repair steps are necessary, greatly impeding and inconveniencing actuator replacement.

Figure 3:
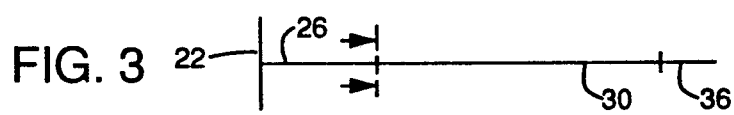
FIGS. 3 and 4 are schematic, elevation, fragmentary views of components of a pre-loaded deformable mirror of the prior art.

Another problem is that the replaced actuator may also be misaligned axially with the contour post. Thus in schematic, when actuator 30 and contour post 26 are in alignment, one has an undistorted face plate 22, as shown in FIG. 3. However, upon replacement, actuator 30 can readily be positioned out of alignment with contour post 26, resulting in a buckle or side force condition applied to such post 26, which can, in turn, result in a permanently warped face plate 23, as shown in schematic in FIG. 4.

Figure 5:
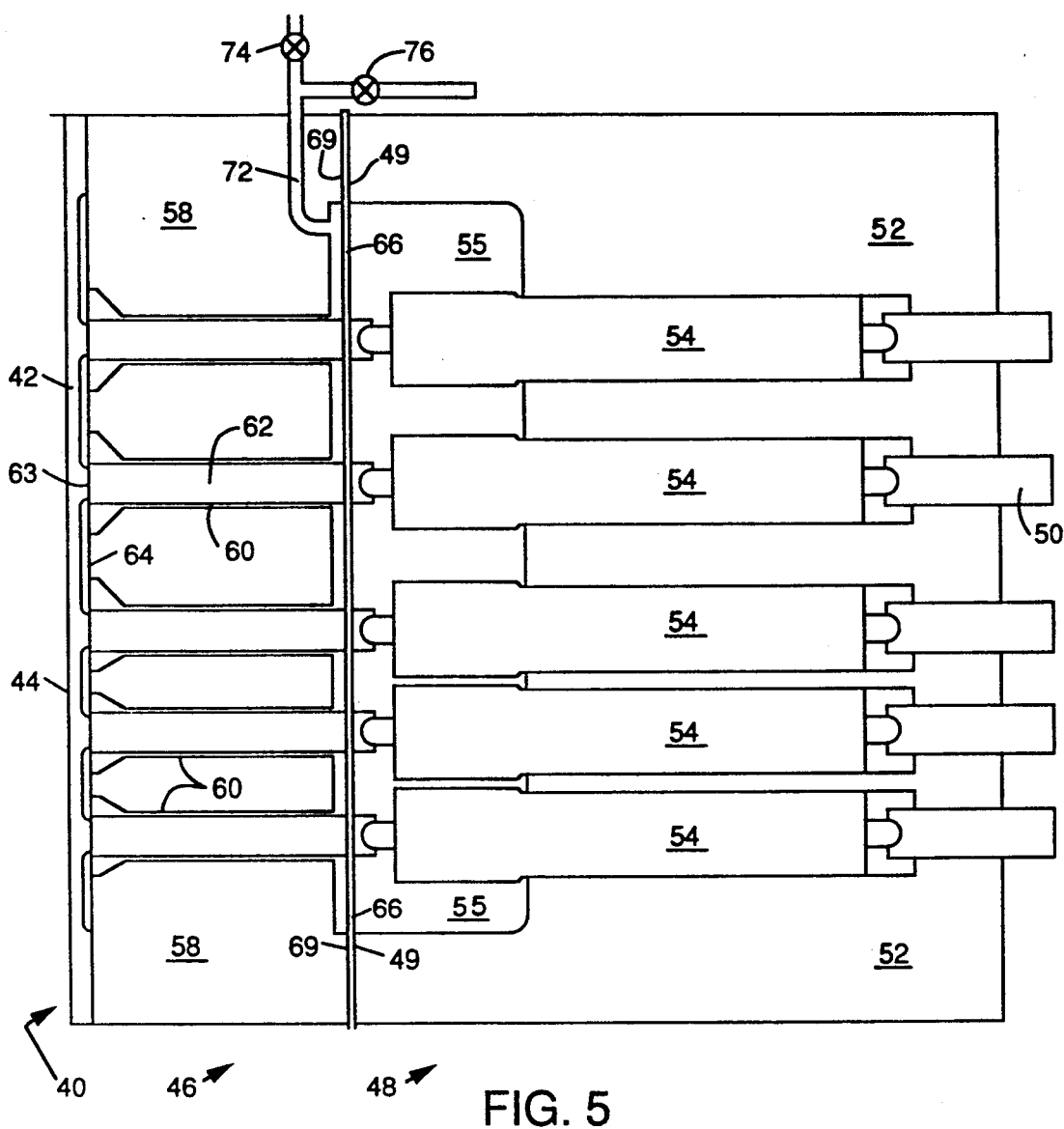
FIG. 5 is a sectional elevation view, partly in section, showing the pre-loaded deformable mirror embodying the present invention.

To correct the above two problems, the pneumatically pre-loaded, deformable mirror 40 of the present invention is provided. Thus the deformable mirror 40 of the invention has face plate 42, having mirror surface 44, backed by a pneumatic pre-load assembly 46 backed, in turn, by actuator assembly 48, as shown in FIG. 5. The actuator assembly includes adjustment screws 50, mounted in actuator block 52, which axially engage actuators 54, including nub 56, as shown in FIG. 5.

The pneumatic pre-load assembly 46 includes a substrate core 58, having apertures 60 therein, having contour posts 62 positioned therein, as shown in FIG. 5. A diaphragm plate 64 is connected to the substrate 58 and the contour posts 62, as shown in FIG. 5. The contour posts 62 are also attached, at the other end thereof, to the rear plate 66 while the substrate 58 is spaced from such rear plate, as shown in FIG. 5. Also the face plate 42 is attached to the diaphragm plate 64, at zones in axial alignment with the posts 62, e.g., at zones 63, as shown in FIG. 5.

The core apertures 60 have a flared-out zone 68 proximate the diaphragm plate 64 and the so-flared aperture zones 60 and 68 together with the space 70 between the core and the back plate 66 define a gas cavity, as indicated in FIG. 5. The gas inlet line 72, has inlet valve 74 and bleed valve, 76 also as shown in FIG. 5.

In operation, the adjustment screws 50 are turned to bring the nubs 56 of each actuator 54 nearly into contact (or into contact) with the nesting caps 67 of rear plate 66. Then gas is admitted via inlet line 72 to the cavity 70, to pressurize same and push the rear plate caps 67 into (further) contact with at least some of the actuator nubs 56. Any actuator nubs not yet in contact with the rear plate caps 67, can be advanced by turning the respective associated adjustment screw 50, until all the actuators 54, by their nubs 56, contact the rear plate 66 by its caps 67, as shown in FIG. 5. The pneumatic pre-load is then increased to the design pressure and a final actuator adjustment is made. That is, the adjustments are made by applying a voltage to the actuator, e.g., a piezoelectric actuator, to obtain the desired mirror surface contour. For example, if the desired contour be flat, such adjustments are made while using an interferometer to monitor the surface flatness of the mirror.

In this regard, reference should be had to a similar pre-loaded deformable mirror embodiment of the invention, shown in FIGS. 6 and 7 discussed below.

The actuator 54 and the pre-loaded post 62, thus work in resilient opposition so that the face plate can be moved back and forth as desired, to adjust the deformable mirror surface 44 to the desired contour. However, should an actuator, e.g., a piezoelectric actuator, cease to function properly and need to be removed and/or replaced, it is desirable to remove the pre-load from the contour post 62 beforehand, so as not to introduce excessive deflection to the face plate 42 to permanently deform the mirror surface. To this end, the pressurized cavity is bled by a gas line 72 and port 76, shown in FIG. 5, to depressurize the rear plate 66 and ease contact therewith by the respective actuators 54, so that one or more thereof can be removed for repair or replacement, including by backing off the adjustment screw 50, if necessary. The replacement actuator can then be installed, repeating the above-described tuning procedure and the mirror surface brought to the same (or nearly the same) contour as before the actuator replacement.

Thus per the pre-loaded deformable mirror of the invention, an actuator or related component is replaced or installed so that a controlled, repeatable, surface deformation can result.

Figure 4:
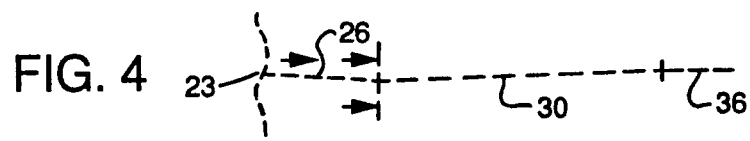
Figure 8:
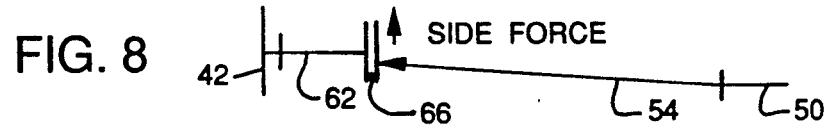
FIG. 8 is a fragmentary elevation schematic view of components of the pre-loaded deformable mirror embodying the present invention.

If the replaced actuator not be in axial alignment with the contour post 62, any side or buckling forces are absorbed by the rear plate 66 and there is no warping of the face plate 42, as shown in schematic in FIG. 8, in contrast with the warping of face plate problems of the prior art, indicated in FIG. 4.

Figure 6:
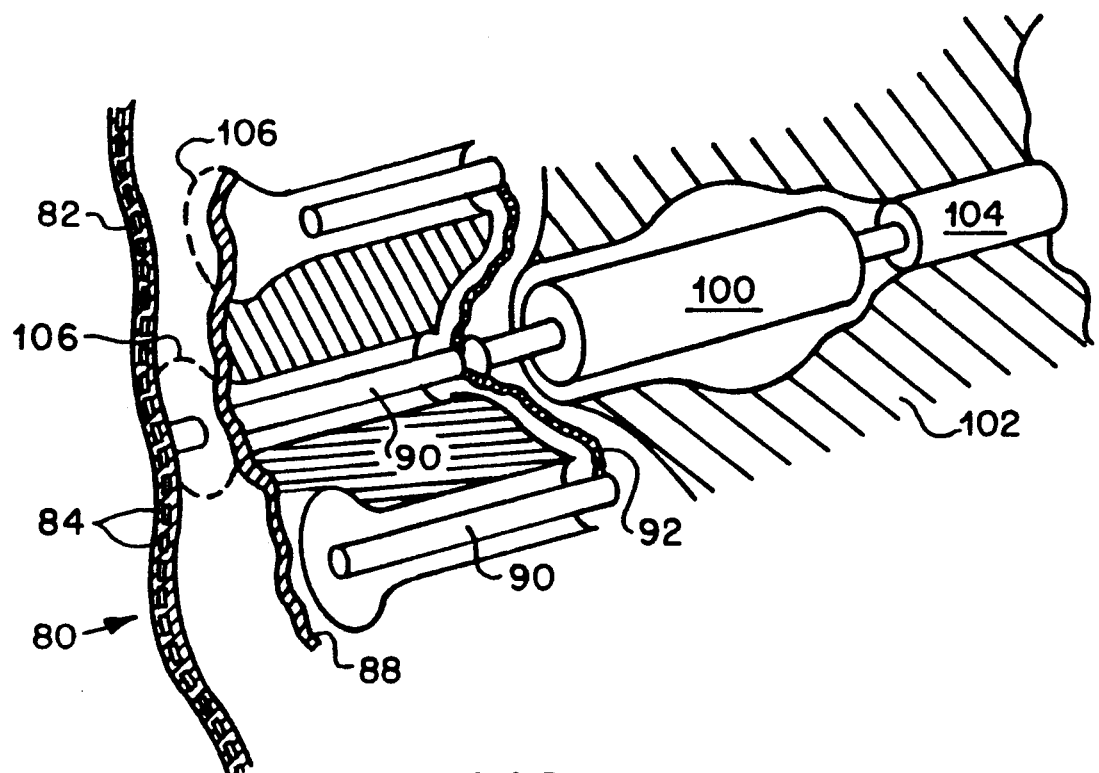
FIG. 6 is a perspective fragmentary view of the pre-loaded deformable mirror shown in FIG. 5.
Figure 7:
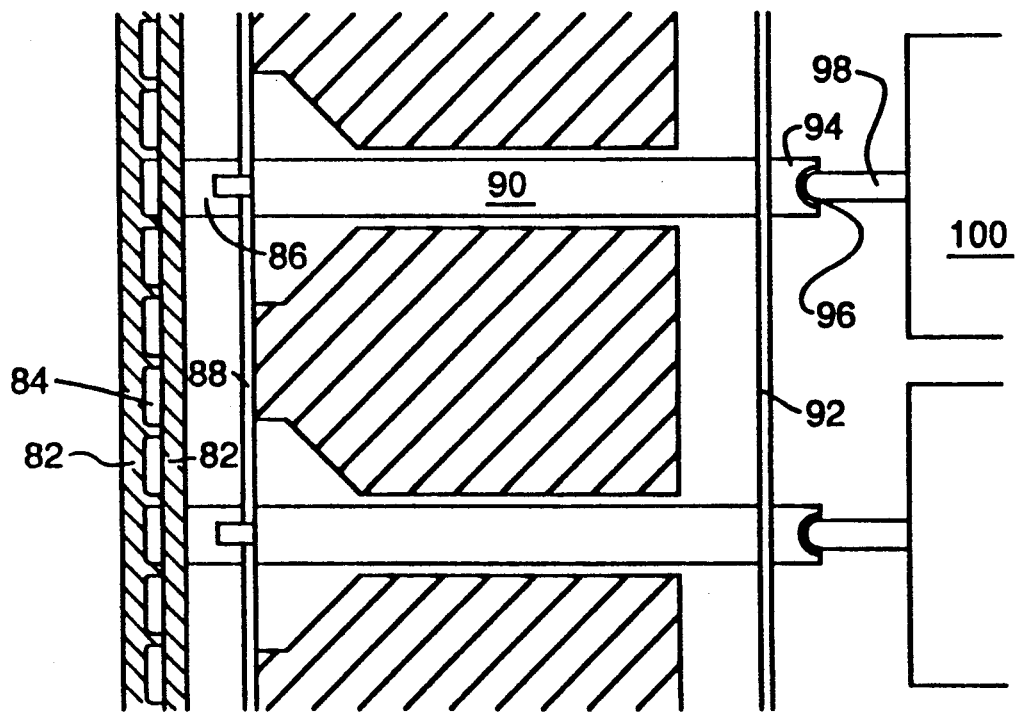
FIG. 7 is a fragmentary elevation view, partly in section, of another pre-loaded deformable mirror embodying the invention

In a different but similar embodiment of the invention, pre-loaded deformable mirror 80 has face plate 82, with waterflow apertures 84 therein for mirror cooling purposes, for reflectance of, e.g., laser beams as shown in FIGS. 6 and 7. Also spacer cap 86, spaces the diaphragm plate 88 from the face plate 82 while joining the contour post 90 to such face plate, as shown in FIG. 7 and indicated in FIG. 6. Also, at the other end of the contour post 90, nesting cap 94, having a nub receiving recess 96 therein, is positioned on the back side of the rear plate 92, in axial alignment with the post 90, so that the recess 96 can receive and center the nub 98 of the actuator 100, as shown in FIG. 7 and indicated in FIG. 6.

In FIG. 6, the actuator block 102 and adjustment screw 104 are shown, as are the outlines 106 of where the post apertures 105 flare out on contact with the rear plate 88.

In theory, a much greater surface area of the back plate 92 is exposed to the back-pressure of the pre-load gas, than is the area of the diaphragm plate at the flared-out (post aperture) area 106, as indicated in FIGS. 6, and 7. This means that upon application of gas pressure to the cavity 95, a significantly greater displacement of the rear plate 92 towards the actuators 100, occurs compared with a minor outward deflection in the opposite direction, of the diaphragm plate 88 and attached face plate 82, as indicated in FIGS. 5 and 7.

Looking at FIG. 5, the rear plate 66 is attached to the core 58 on both sides of the active zone 55, e.g., at contact area 69 and such plate is similarly attached to the actuator block (on its reverse side), e.g., at contact area 49.

As can be seen, the present invention includes two salient features 1) actuator replaceability due to ready removal of the pre-load and 2) the junction of post and actuator is restrained from buckling and lateral movement, by the rear plate interposed therebetween, which means that any lateral forces applied by the actuator due to misalignment thereof with a post, will not result in degradation of the mirror figure. Thus an actuator can be removed and/or replaced and a reproducible mirror contour obtained as noted above.

Stated another way, the key points of the invention include; 1) the pneumatic pre-load design, which allows removal and replacement of the actuators, while maintaining mirror surface quality and 2) the prevention of mirror deformation due to misalignment of actuator with contour post.

Thus the pneumatic pre-load design of the invention solves the above problems by simplifying the actuator removal and replacement process.

The design is much less sensitive to normal tolerances in actuator and related mirror component manufacture and the pre-load (being controlled by application of gas pressure) can be removed or adjusted at will, eliminating the possibility of overstressing the mirror face plate.

The diaphragm plate and the rear plate are desirably flexible in the axial direction but relatively stiff in the lateral direction, i.e. in the plane thereof and can be made of metal, plastic and the like.

The actuator block can be of metal, e.g. Al or stainless steel or a ceramic and preferably is of metal.

The core, posts and plates are a desirably of a relatively stiff material such as metal, e.g. Mb or Al or ceramic, e.g. SiC and preferably are of metal. The apertures through the core are kept relatively small, e.g. flare out, as discussed above, to keep the core as stiff as possible for structural strength of the deformable mirror of the invention.

The actuator is preferably a piezoelectric actuator, e.g. with a stack of piezo wafers so as to give a displacement, e.g., in the range of 10 to 50 um.

The actuator can also be mechanical, hydraulic, magnetic and the like, within the scope of the present invention.

The nesting caps (for the actuator nubs) can be, e.g., braised to the rear plate or be projections molded in such rear plate.

The mirror can be cooled or uncooled, depending upon the light reflected. For laser beams, a water-cooled, face plate is preferred to prevent overheating thereof.

The invention thus provides a controlled repeatable, surface deformation in a deformable mirror, 1) by releasing the pneumatic pre-load when uncoupling a component therefrom, e.g., replacing an actuator (which can be of a different size than its predecessor) and 2) by reapplying such pre-load to the replacement. The invention also prevents as noted above, mirror surface distortion from a change in actuator alignment.

In addition to the actuator replacement advantages described above, the pre-loaded deformable mirror of the invention solves another problem. That is, after release of the gas pre-load, the plate assembly is readily detached from the actuator block. Thereafter, assuming the plate assembly is all of the same material, including the plates, posts, and core, e.g. of molybdenum or aluminum, such assembly can be subjected to high temperature procedures, without distortion thereof. Thus a reflective coating can be applied to the mirror surface of the assembly at the required high temperature of up to 200° C. or more (e.g. in a vacuum chamber), without damage to the previously detached actuator block, especially the actuators which can be expensive. Also the so-detached plate assembly can be clamped down for polishing of the mirror, without subjecting the actuators to the forces incident thereto.

Thereafter the so-processed mirror assembly can be rejoined to the actuator block, mechanically tuned by turning of the respective adjustments screws, gas pre-loaded, as described above, with little or no misalignment of the mirror surface from the desired contour. Any remaining contour correction can be done of course, by adjustment of the respective actuators.

What is claimed is:

1. A deformable mirror having a face plate and a plurality of axially movable actuators for controlling the surface contour of such mirror, the improvement comprising, inserting a pneumatic pre-load assembly between such actuators and said face plate, which assembly includes:

a) diaphragm plate mounted behind and proximate said face plate, b) a rear plate, spaced from and behind said diaphragm plate, c) an apertured core mounted between said diaphragm and rear plates, which core is attached to said diaphragm plate and spaced from said rear plate to define a cavity therewith and therein.

d) a plurality of contour posts, each mounted in and through an aperture in said core, each post contacting said diaphragm plate and then said face plate at one end and contacting said rear plate at the other end of such post so as to substantially align with an actuator, e) means to apply gas pressure between said diaphragm and rear plates and in the cavity not occupied by said core, to move said posts and rear plate into contact with said actuators to pneumatically pre-load same, so that the face plate and mirror contour surface are adjustable by axial adjustment of said posts due to changes in the length of said actuators and f) means to release the applied gas from said cavity and reduce the actuator pre-load for removal and/or replacement of an actuator or other component of said assembly.

2. The deformable mirror of claim 1 having piezoelectric actuators.

3. The deformable mirror of claim 1 having piezoelectric actuators which are extended by application of voltage thereto and compressed by such pre-load when said voltage is turned off.

4. The deformable mirror of claim 1 wherein the other end of at least one actuator engages an adjustment screw mounted in an actuator block, the turning of which adjusts the longitudinal position of said actuator relative to said rear plate and before actuator extension, if any, relative to said rear plate, before or after actuator extension to said pre-load.

5. The deformable mirror of claim 4 wherein, after said pre-load is released and said actuator is replaced, means are provided to turn said screw, to reapply said gas pressure to pre-load said actuators and to activate them so as to finely tune the contour of the mirror surface at the associated post locale and to nearly or closely restore the pre-replacement mirror surface contour.

6. The deformable mirror of claim 1 wherein the core aperture around each post flares outwardly, proximate said diaphragm plate.

7. The deformable mirror of claim 1, wherein a nesting cap is mounted on the opposite side of said rear plate from each post proximate thereto to provide a nesting receptacle for the end of each actuator proximate each such post for self-centering axial engagement thereof.

8. The deformable mirror of claim 1 wherein said face plate has flow passages therein for water cooling thereof.

9. The deformable mirror of claim 1 wherein said rear plate, being interposed between post and actuator, is of metal and reduces side-force buckling and thus face plate warping.

* * * * *